US010668919B2

(12) United States Patent
Takahashi et al.

(10) Patent No.: US 10,668,919 B2
(45) Date of Patent: Jun. 2, 2020

(54) OBJECT DETECTION APPARATUS AND OBJECT DETECTION METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Toru Takahashi, Kariya (JP); Yosuke Ito, Kariya (JP); Jun Tsuchida, Okazaki (JP); Masayuki Shimizu, Numazu (JP)

(73) Assignees: DENSO CORPORATION, Kariya, Aichi-pref (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 205 days.

(21) Appl. No.: 15/562,172

(22) PCT Filed: Mar. 29, 2016

(86) PCT No.: PCT/JP2016/060167
§ 371 (c)(1),
(2) Date: Sep. 27, 2017

(87) PCT Pub. No.: WO2016/158970
PCT Pub. Date: Oct. 6, 2016

(65) Prior Publication Data
US 2018/0079408 A1    Mar. 22, 2018

(30) Foreign Application Priority Data
Mar. 31, 2015    (JP) .................................. 2015-072920

(51) Int. Cl.
*B60W 30/095* (2012.01)
*B60T 8/1755* (2006.01)
(Continued)

(52) U.S. Cl.
CPC ..... *B60W 30/0953* (2013.01); *B60K 31/0008* (2013.01); *B60T 7/22* (2013.01);
(Continued)

(58) Field of Classification Search
CPC ........... B60K 31/0008; B60T 2201/024; B60T 8/17558; B60W 2550/10; B60W 30/08; G06K 9/00791
See application file for complete search history.

(56) References Cited

U.S. PATENT DOCUMENTS

2009/0043462 A1*   2/2009   Stratton ................ E02F 9/2033
                                                701/50
2010/0030426 A1*   2/2010   Okita ........................ B60T 7/22
                                                701/41
(Continued)

FOREIGN PATENT DOCUMENTS

JP      2006-154967    *   6/2006
JP      2006-154967  A     6/2006
(Continued)

*Primary Examiner* — Ryan Rink
(74) *Attorney, Agent, or Firm* — Knobbe, Martens, Olson & Bear, LLP

(57) ABSTRACT

An object detection apparatus acquires a lateral position which is a relative position of a target to the own vehicle, and determines that a first target is present, as the target, ahead of the own vehicle and that a second target is present between the first target and the own vehicle. The object detection apparatus determines, based on the lateral position of the first target and a limiting value which indicates a width in the lateral direction, whether the first target is present on a traveling course of the own vehicle. The object detection apparatus sets the limiting value such that when the second target is not present, sets as the limiting value, a predetermined reference value, and when the second target is present, sets as the limiting value, a value different from the reference value.

16 Claims, 6 Drawing Sheets

(51) Int. Cl.
    *G06K 9/00*     (2006.01)
    *G08G 1/16*     (2006.01)
    *B60K 31/00*     (2006.01)
    *B60W 30/08*     (2012.01)
    *B60T 7/22*     (2006.01)
    *B60W 30/09*     (2012.01)
    *B60T 7/12*     (2006.01)

(52) U.S. Cl.
    CPC ......... *B60T 8/17558* (2013.01); *B60W 30/08* (2013.01); *B60W 30/09* (2013.01); *G06K 9/00805* (2013.01); *G08G 1/166* (2013.01); *B60T 7/12* (2013.01); *B60T 2201/024* (2013.01); *B60W 2550/10* (2013.01)

(56) References Cited

U.S. PATENT DOCUMENTS

| | | | |
|---|---|---|---|
| 2013/0010112 A1* | 1/2013 | Goto | H04N 7/18 348/148 |
| 2013/0013184 A1* | 1/2013 | Morotomi | G08G 1/163 701/301 |
| 2014/0152488 A1 | 6/2014 | Baba | |
| 2014/0278059 A1* | 9/2014 | Gunther | G01C 21/3655 701/414 |
| 2015/0232073 A1* | 8/2015 | Fujishiro | B60T 7/22 701/70 |
| 2016/0090085 A1* | 3/2016 | Ike | G08G 1/166 701/36 |
| 2017/0003390 A1 | 1/2017 | Baba | |
| 2018/0236985 A1* | 8/2018 | Kim | G06F 16/2365 |
| 2019/0001970 A1* | 1/2019 | Takahashi | B60T 7/12 |
| 2019/0088136 A1* | 3/2019 | Nagata | G08G 1/167 |

FOREIGN PATENT DOCUMENTS

| | | | | |
|---|---|---|---|---|
| JP | 2012-141770 A | | 7/2012 | |
| JP | 2012141770 | * | 7/2012 | |
| JP | 2014-109943 | * | 6/2014 | |
| JP | 2014-109943 A | | 6/2014 | |
| JP | 5641271 B1 | * | 12/2014 | G08G 1/166 |
| JP | 5641271 B1 | | 12/2014 | |

* cited by examiner

OBJECT DETECTION APPARATUS AND OBJECT DETECTION METHOD

CROSS-REFERENCE TO RELATED APPLICATION

This application is based on and claims the benefit of priority from earlier Japanese Patent Application No. 2015-072920 filed on Mar. 31, 2015, the description of which is incorporated herein by reference.

TECHNICAL FIELD

The present disclosure relates to an object detection technique of determining whether a target present ahead of the own vehicle in a traveling direction is present on a traveling course of the own vehicle.

BACKGROUND ART

Pre-crash safety (PCS) has been conventionally realized which reduces or prevents damage of a collision between the own vehicle and a target such as another vehicle, a pedestrian, or a road structure, located ahead of the own vehicle in a traveling direction. According to PCS, a time to collision (TTC) which is a predicted time until the own vehicle collides with an obstacle is calculated based on a relative distance between the own vehicle and the obstacle and a relative speed or a relative acceleration between the own vehicle and the obstacle. Then, based on the time to collision thus calculated, the PCS notifies the driver of the approach of the own vehicle to the obstacle through a notification device or the like, or activates a braking device of the own vehicle.

On a road, there is a case where an obstacle such as a parked vehicle is present between the own vehicle and a target. In such a case, it is necessary to detect the target present on the other side of the obstacle and respond to the target which suddenly appears from the other side of the obstacle.

Thus, for example, PTL 1 discloses an object detection apparatus for detecting a pedestrian present on the other side of an obstacle present ahead of the own vehicle in a traveling direction. According to the object detection apparatus disclosed in PTL 1, an image of the forward area of the own vehicle in the traveling direction is captured and image recognition is performed with respect to the captured image. Thus, the object detection apparatus can recognize an upper part of a body or the like of a pedestrian in a region including an obstacle in the captured image. In this case, the object detection apparatus determines that the pedestrian is present on the other side of the obstacle. A distance between the recognized pedestrian and the own vehicle is detected by a radar device.

CITATION LIST

Patent Literature

PTL 1: JP 2014-109943 A

SUMMARY OF THE INVENTION

Technical Problem

In the case where an obstacle is present between the own vehicle and a target to be detected, detection accuracy of a position and a speed of the target is generally reduced. In the case where such a position and the speed of the target detected with low accuracy are used to activate a safety device, there is a possibility that the safety device will be activated when not required to be activated. Conversely, there is a possibility that the safety device will not be activated when required to be activated.

An object of the present disclosure is to provide an object detection apparatus and an object detection method each of which is capable of accurately determining a possibility that a target will be present on a traveling course of the own vehicle in the case where a plurality of targets are present ahead of the own vehicle.

Solution to Problem

An object detection apparatus of the present disclosure includes an acquisition means, a target determination means, a setting means, and a presence determination means. The acquisition means acquires a lateral position which is a relative position of a target to the own vehicle in a lateral direction orthogonal to a traveling direction of the own vehicle, the target being located ahead of the own vehicle in traveling direction. The target determination means determines that a first target is present ahead of the own vehicle as the target, and that a second target is present between the first target and the own vehicle. The setting means sets a limiting value which indicates a width in the lateral direction. The presence determination means determines whether the first target is present on a traveling course of the own vehicle based on the lateral position of the first target and the limiting value. The setting means sets a predetermined reference value which is a criterion for determining whether the first target is present on the traveling course of the own vehicle, as the limiting value when the second target is not present, and sets a value different from the reference value, as the limiting value when the second target is present.

When a second target is present between the own vehicle and a first target, detection accuracy of a lateral position of the first target is decreased. Accordingly, the lateral position of the target detected with low accuracy is used for comparison with a limit value to determine whether the first target is present on a traveling course of the own vehicle, based on the results of the comparison. In this case the accuracy of the determination is also decreased. According to the object detection apparatus of the present disclosure, therefore, in the case where the second target is present between the own vehicle and the first target, the limiting value for determining whether the first target is present on the traveling course of the own vehicle is set to a value different from a value to be set in the case where the second target is not present. This allows the object detection apparatus of the present disclosure to prevent an erroneous determination on whether the target is present on the traveling course of the own vehicle, based on the lateral position of the target detected with low accuracy.

DESCRIPTION OF THE EMBODIMENTS

Figure 1:
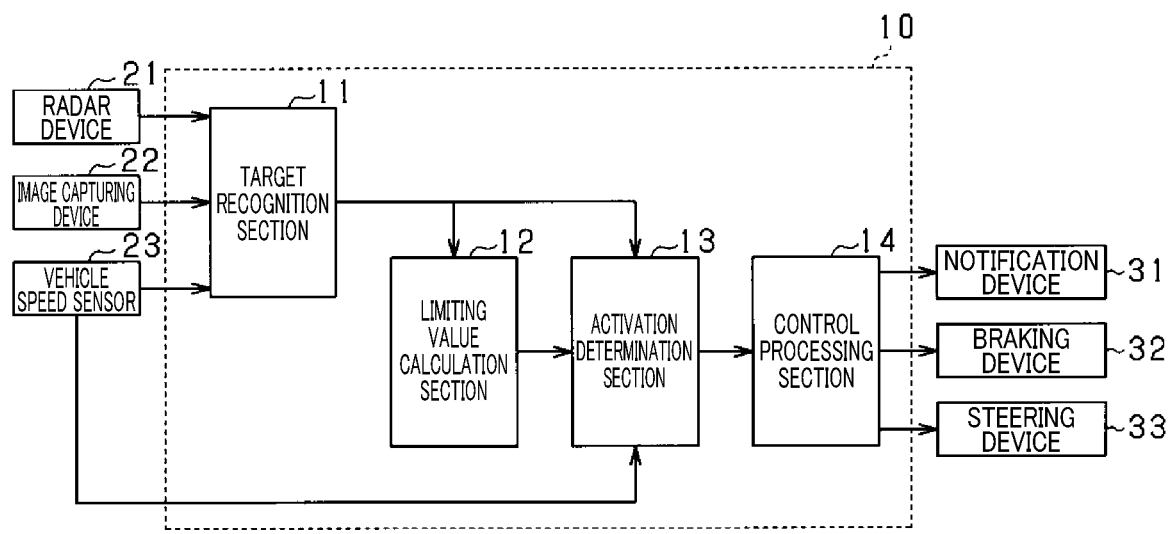
FIG. 1 is a diagram illustrating an overall configuration of an object detection apparatus.

Some embodiments will be described hereinafter with reference to drawings. The same or equivalent parts in the embodiments described below are given the same reference signs in the drawings and earlier descriptions should be referred to regarding those parts given the same reference signs.

First Embodiment

An object detection apparatus according to the present embodiment is mounted on a vehicle (own vehicle) and detects a target present around the own vehicle such as a target ahead of the own vehicle in the traveling direction. The object detection apparatus then performs control for avoiding a collision between the target thus detected and the own vehicle or reducing damage of a collision. Thus, the object detection apparatus according to the present embodiment functions as a pre-crash safety (PCS) system.

FIG. 1 illustrates an example of an overall configuration of the object detection apparatus according to the present embodiment. As illustrated in FIG. 1, a driving assist ECU 10 which is the object detection apparatus according to the present embodiment is a computer including a CPU, a memory (e.g., a ROM and a RAM), I/O, and the like. The driving assist ECU 10 includes functions which are a target recognition section 11, a limiting value calculation section 12, an activation determination section 13, and a control processing section 14. The driving assist ECU 10 realizes each of the functions by causing the CPU to execute, for example, a program which is installed in the ROM.

The driving assist ECU 10 is connected to a sensor device which inputs various types of detection information. Examples of the sensor device to be connected to the driving assist ECU 10 include a radar device 21, an image capturing device 22, a vehicle speed sensor 23 and the like.

The radar device 21 is, for example, a millimeter wave radar which transmits a high frequency signal in a millimeter wave band as probe waves. The radar device 21 is provided in a front end of the own vehicle. The radar device 21 considers a region extending over a predetermined angular range as a detectable region for a target, and detects a position of the target in the detectable region. Specifically, the radar device 21 transmits probe waves at a predetermined control cycle and receives reflection waves via each of a plurality of antennas. Based on a transmission time of the probe waves and a reception time of the reflection waves, the radar device 21 calculates a distance to the target which has reflected the probe waves. A frequency of the reflection waves reflected by the target is changed by the Doppler effect. Accordingly, based on the changed frequency of the reflection waves, the radar device 21 calculates a relative speed to the target which has reflected the probe waves. The radar device 21 further calculates cardinal points of the target which has reflected the probe waves, based on a phase difference of the reflection waves received via the plurality of antenna. In the case where the position and the cardinal points of the target can be calculated, it is possible to specify a relative position of the target to the own vehicle. The radar device 21 performs, for each predetermined control cycle, transmission of probe waves, reception of reflection waves, and calculation of a relative position and a relative speed of the target to the own vehicle. The radar device 21 then transmits, to the driving assist ECU 10, the calculated relative position and relative speed per unit time.

The image capturing device 22 is, for example, a CCD camera, a CMOS image sensor, a near infrared camera, or the like. The image capturing device 22 is provided to the center of the vehicle in the vehicle width direction at a predetermined height. The image capturing device 22 captures a bird's-eye view image of a region ahead of the own vehicle extending at a predetermined angle. The image capturing device 22 extracts feature points indicating presence of a target from the captured image. Specifically, the image capturing device 22 extracts edge points based on luminance information of the captured image, and performs a Hough Transform for the edge points thus extracted. In the Hough Transform, points extracted as feature points include, for example, points on a straight line that are a plurality of successive edge points, or points at each of which straight lines cross at right angles. The image capturing device 22 captures an image and extracts feature points at a control cycle that is the same as or different from that of the radar device 21. The image capturing device 22 then transmits results of the extraction of the feature points to the driving assist ECU 10.

The vehicle speed sensor 23 is provided on a rotating shaft which transmits power to wheels of the own vehicle. The vehicle speed sensor 23 detects a speed of the own vehicle based on the number of rotations of the rotating shaft.

The driving assist ECU 10 is connected to various safety devices each of which is driven by control commands provided from the driving assist ECU 10. Examples of the safety devices to be connected to the driving assist ECU 10 include a notification device 31, a braking device 32, and a steering device 33.

The notification device 31 is, for example, a loudspeaker, a display, or the like which is provided to the interior of the own vehicle. Upon determination by the driving assist ECU 10 that there is a possibility that the own vehicle will collide with an obstacle, the notification device 31 notifies a driver of a collision risk by outputting an alarm sound, an alarm message, or the like, based on control commands provided from the driving assist ECU 10.

The braking device 32 is a braking device which performs braking of the own vehicle. Upon determination by the driving assist ECU 10 that there is a possibility that the own vehicle will collide with an obstacle, the braking device 32 is activated based on control commands provided from the driving assist ECU 10. Specifically, the braking device 32 increases a braking force generated in response to a braking operation by the driver, or in the case where the driver has not performed a braking operation, the braking device 32 performs automatic braking. That is, the braking device 32 provides the driver with a brake assist function and an automatic brake function.

The steering device 33 is a control device which controls a traveling course of the own vehicle. Upon determination by the driving assist ECU 10 that there is a possibility that the own vehicle will collide with an obstacle, the steering device 33 is activated based on control commands provided from the driving assist ECU 10. Specifically, the steering device 33 assists an avoidance steering operation by the driver, or in the case where the driver has not performed an avoidance steering operation, the steering device 33 performs automatic steering. That is, the steering device 33 provides the driver with an avoidance steering assist function and an automatic steering function.

The target recognition section 11 of the driving assist ECU 10 will be described below. The target recognition section 11 of the present embodiment functions as acquisition means. The target recognition section 11 acquires detection information (results of the calculation of the position) as first detection information from the radar device 21. The target recognition section 11 acquires detection information (results of the extraction of the feature points) as second detection information from the image capturing device 22. The target recognition section 11 then associates, in the following manner, first position information indicated by the position acquired from the first detection information with second position information indicated by the feature points acquired from the second detection information. That is, the target recognition section 11 associates, as position information of a single target, first position information and second position information which indicate respective positions close to each other.

The target recognition section 11 performs pattern matching with respect to the target for which the first position information and the second position information have been associated. Specifically, the target recognition section 11 performs pattern matching with respect to the second detection information with use of pattern data which has been prepared in advance for each of conceivable types of target. The target recognition section 11 then functions as type determination means. The target recognition section 11 determines whether the detected target is a vehicle or a pedestrian (passerby) based on results of the pattern matching, and associates results of the determination with the target as a type of target. According to the present embodiment, a concept of the passerby which is one of the types of target can include a bicycle rider. Furthermore, the types of target can include an animal or the like, other than the vehicle and the passerby.

Subsequently, the target recognition section 11 associates a relative position and a relative speed of the target to the own vehicle with respect to the target of which type has been determined. The relative position to be associated with the target includes a longitudinal position which is a relative position in the traveling direction of the own vehicle and a lateral position which is a relative position in a direction orthogonal to the traveling direction. The target recognition section 11 calculates a longitudinal speed which is a relative speed in the traveling direction of the own vehicle and a lateral speed which is a relative speed in the direction orthogonal to the traveling direction based on the relative position and the relative speed.

The target recognition section 11 further identifies the type of target in accordance with results of the determination of whether the target is a vehicle or a pedestrian and with the longitudinal speed and the lateral speed.

For example, when a type of the target is determined to be a vehicle, a type of the vehicle can be further identified as below. That is, the target recognition section 11 identifies four types of vehicle based on the longitudinal speed and the lateral speed. Specifically, the target recognition section 11 identifies a preceding vehicle traveling ahead of the own vehicle in the traveling direction of the own vehicle and an oncoming vehicle traveling ahead of the own vehicle in the traveling direction toward a direction opposite to the traveling direction of the own vehicle (traveling in an opposite lane). Furthermore, the target recognition section 11 identifies a stationary vehicle (a stopped vehicle or a parked vehicle) which stands still ahead of the own vehicle in the traveling direction and a crossing vehicle passing across ahead of the own vehicle in the traveling direction.

When a type of the target is determined to be a pedestrian, a type of the pedestrian can be further identified as below. That is, the target recognition section 11 identifies four types of pedestrian based on the longitudinal speed and the lateral speed. Specifically, the target recognition section 11 identifies a preceding pedestrian who is walking ahead of the own vehicle in the traveling direction of the own vehicle and an oncoming pedestrian who is walking ahead of the own vehicle in a direction opposite to the traveling direction of the own vehicle. Furthermore, the target recognition section 11 identifies a stationary pedestrian who stands still ahead of the own vehicle in the traveling direction and a crossing pedestrian who is passing across ahead of the own vehicle in the traveling direction.

In regard to a target which has been detected only based on the first detection information, a type of the target can be further identified as below. That is, the target recognition section 11 identifies four types of target based on the longitudinal speed and the lateral speed. Specifically, the target recognition section 11 identifies a preceding target moving ahead of the own vehicle in the traveling direction of the own vehicle and an oncoming target moving ahead of the own vehicle in traveling direction toward a direction opposite to the traveling direction of the own vehicle. Furthermore, the target recognition section 11 identifies a stationary target which stands still ahead of the own vehicle in the traveling direction and a crossing target passing across ahead of the own vehicle in the traveling direction.

Figure 2:
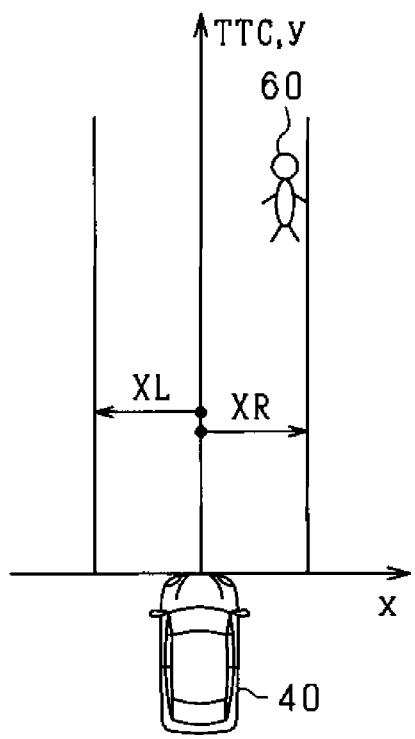
FIG. 2 is a view illustrating a determination region of a first embodiment.

With reference to FIG. 2, the following description will discuss the activation determination section 13 of the driving assist ECU 10. Specifically, a description will be given of a determination process (a determination process for determining whether the safety device is to be activated) which is performed by the activation determination section 13. For simplification of the description, FIG. 2 includes an x-axis indicative of a position (a lateral position) in a lateral direction orthogonal to a traveling direction of an own vehicle 40 and a y-axis indicative of a position (a longitudinal position) in the traveling direction (a longitudinal direction). The activation determination section 13 of the present embodiment functions as setting means. The activation determination section 13 sets a rightward limiting value XR and a leftward limiting value XL in the lateral direction orthogonal to the traveling direction of the own vehicle 40 such that the rightward limiting value XR indicates a rightward width extending from a center axis of the own vehicle 40 to a right side when facing ahead of the own vehicle 40 in the traveling direction and the leftward limiting value XL indicates a leftward width extending from the center axis of the own vehicle 40 to a left side when facing ahead of the own vehicle 40 in the traveling direction. The rightward limiting value XR and the leftward limiting value XL are values which have been determined in advance for each type of the target 60. Accordingly, the activation determination section 13 sets the rightward limiting value XR and the leftward limiting value XL based on a type of the target 60. For example, in the case where the type of the target 60 is a preceding vehicle, the target 60 is less likely to suddenly move in the lateral direction, and thus, the activation determination section 13 sets the rightward limiting value XR and the leftward limiting value XL to values smaller than those to be set in the case where the target 60 is likely to suddenly move in the lateral direction. Meanwhile, in the case where the type of the target 60 is a pedestrian, the target 60 is likely to suddenly move in the lateral direction, and thus, the activation determination section 13 sets the rightward limiting value XR and the leftward limiting value XL to values larger than those to be set in the case where the target 60 is less likely to suddenly move in the lateral direction. By using the rightward limiting value XR and the leftward limiting value XL which have been thus set, the activation determination section 13 sets, ahead of the own vehicle 40 in traveling direction (on a traveling course), a determination region that has a rightward width based on the rightward limiting value XR and has a leftward width based on the leftward limiting value XL. Thus, the activation determination section 13 sets a region for determining whether the target 60 is present on the traveling course of the own vehicle 40. The rightward limiting value XR and the leftward limiting value XL are each acquired as a reference value (an initial value) of a limiting value by the limiting value calculation section 12. The limiting value calculation section 12 calculates a limiting value indicative of a width in the lateral direction ahead of the own vehicle 40 in traveling direction. The activation determination section 13 then functions as presence determination means. Based on a lateral position of the target 60 and the determination region (limiting value) which has been set, the activation determination section 13 determines whether the target 60 is present on the traveling course of the own vehicle 40. In the case where the lateral position of the target 60 is inside the determination region (within a range of the limiting value), the activation determination section 13 determines that the target 60 is present on the traveling course of the own vehicle 40. Meanwhile, in the case where the lateral position of the target 60 is outside the determination region (outside the range of the limiting value), the activation determination section 13 determines that the target 60 is not present on the traveling course of the own vehicle 40.

Furthermore, the activation determination section 13 functions as activation determination means. The activation determination section 13 determines whether to activate the safety device, based on a timing of activation and a time to collision (TTC). In this case, the activation determination section 13 functions as collision time predicting means. Based on the longitudinal speed and the longitudinal position which have been acquired from the target recognition section 11, the activation determination section 13 calculates a time to collision (TTC) which is a predicted time until the own vehicle 40 collides with the target 60. The time to collision (TTC) can be also calculated by using a relative acceleration instead of the longitudinal speed.

The timing of activation is set for each safety device. Specifically, an earliest timing of activation is set for the notification device 31 among the safety devices. This is because if the driver notices a collision risk by being notified by the notification device 31 and depresses a brake pedal, it is possible to avoid a collision without control commands provided from the driving assist ECU 10 to the braking device 32. In regard to the braking device 32, a timing of activation is set for each of the brake assist function and the automatic brake function of the braking device 32. The same applies to the steering device 33. The timings of activation of the braking device 32 and the steering device 33 can be the same values or different values.

According to the present embodiment, the timings of activation are set as described above. Accordingly, in the case where the own vehicle 40 and the target 60 approach each other so that a time to collision (TTC) becomes short, the time to collision (TTC) is first the timing of activation of the notification device 31. In this case, the activation determination section 13 transmits an activation determination signal for the notification device 31 to the control processing section 14. As a result, based on the received activation determination signal, the control processing section 14 transmits control command signal to the notification device 31. This causes the notification device 31 to be activated to notify the driver of a collision risk. That is, in the case where the time to collision (TC) has reached the timing of activation of the safety device, the activation determination section 13 determines to activate the safety device. Meanwhile, in the case where the time to collision (TTC) has not reached the timing of activation of the safety device, the activation determination section 13 determines not to activate the safety device.

In the case where the own vehicle 40 and the target 60 further approach each other so that the time to collision (TTC) further becomes shorter while the driver is not depressing the brake pedal after the notification device 31 has been activated, the time to collision (TTC) is the timing of activation of the automatic brake function of the braking device 32. In this case, the activation determination section 13 transmits an activation determination signal for the automatic brake function to the control processing section 14. As a result, based on the received activation determination signal, the control processing section 14 transmits a control command signal for the automatic brake function to the braking device 32. This causes the automatic brake function of the braking device 32 to be activated to control braking of the own vehicle 40.

In the case where the time to collision (TTC) further becomes shorter while the driver is depressing the brake pedal, the time to collision (TTC) is the activation timing for the brake assist function of the braking device 32. In this case, the activation determination section 13 transmits an activation determination signal for the brake assist function to the control processing section 14. As a result, based on the received activation determination signal, the control processing section 14 transmits a control command signal for the brake assist function to the braking device 32. This causes the brake assist function of the braking device 32 to be activated to perform control of increasing a braking force with respect to an amount of depression of the brake pedal by the driver.

In the case where a relative speed between the own vehicle 40 and the target 60 is large, it may be difficult to avoid a collision between the own vehicle 40 and the target 60 by control of the braking device 32. In such a case, the steering device 33 is automatically activated so that a collision is avoided In the case where the driver has performed a steering operation but the target 60 is located inside the determination region (within the range of the limiting value), the steering operation by the driver is assisted so that a collision is avoided.

Figure 3:
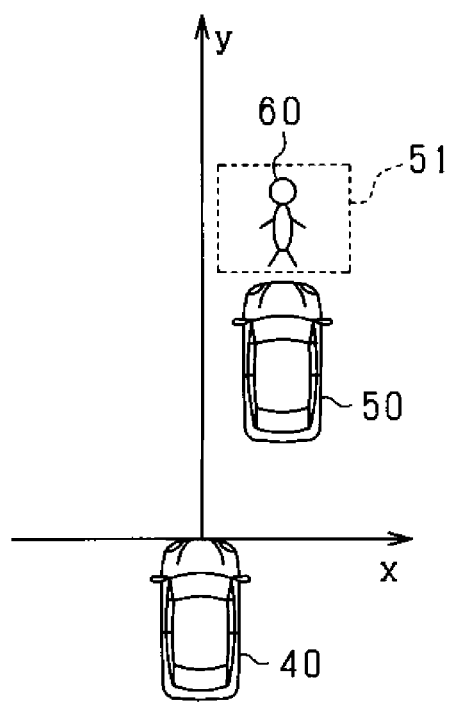
FIG. 3 is a view illustrating a state where an obstacle is present between the own vehicle and a target.

When performing the collision avoidance control described above, the driving assist ECU 10 needs to perform the control by assuming, for example, a case illustrated in FIG. 3. Specifically, the driving assist ECU 10 needs to detect a target (first target) 60 such as a pedestrian present on the other side of an obstacle (second target) 50 such as a stationary vehicle which is stopped or parked and to perform control for avoiding a collision with the detected target 60. Note here that "the other side" means, as illustrated in FIG. 3, a side of the obstacle 50, in the traveling direction of the own vehicle 40. Accordingly, the target recognition section 11 functions as target determination means. The target recognition section 11 determines whether the detected target 60 is present on the other side of the obstacle 50 which is a stationary object. The target recognition section 11 first recognizes, in the following manner, the obstacle 50 which is a stationary object. That is, the target recognition section 11 acquires a relative speed of the obstacle 50 to the own vehicle 40 from the radar device 21, and acquires a speed of the own vehicle 40 from the vehicle speed sensor 23. In the case where an absolute value of the relative speed detected by the radar device 21 is equal to that of the speed of the own vehicle 40 detected by the vehicle speed sensor 23 and these absolute values are opposite in sign, the target recognition section 11 recognizes that the obstacle 50 is a stationary object. According to the driving assist ECU 10, the obstacle 50 which has been thus recognized is also an operation subject of the aforementioned collision avoidance control.

In the case where the obstacle 50 which is a stationary object is present (in the case where the target recognition section 11 has recognized that the obstacle 50 is a stationary object), the target recognition section 11 determines in the following manner whether the target 60 is present on the other side of the obstacle 50. The target recognition section 11 acquires a relative position of the target 60 to the own vehicle 40 from the radar device 21. The target recognition section 11 then determines the presence of the target 60 by determining whether the relative position of the target 60 is in a predetermined detection region 51 which is set to be on the other side of the obstacle 50. The radar device 21 can detect the target 60 even in the case where the obstacle 50 is present between the own vehicle 40 and the target 60. For example, probe waves which are transmitted from the radar device 21 reaches the target 60 from a left side, a right side, or an upper side of the obstacle 50 and is reflected by the target 60. In the case where, as with a vehicle or the like, the obstacle 50 has a space below, probe waves reach the target 60 from the space and are reflected by the target 60.

A method in which a presence of the target 60 is determined by the target recognition section 11 (a method of determining whether the target 60 is present on the other side of the obstacle 50) is not limited to this. For example, the target recognition section 11 can determine, based on an image acquired from the image capturing device 22, whether the target 60 is present on the other side of the obstacle 50. In this case, the target recognition section 11 performs pattern matching with respect to an image region around the obstacle 50. Based on results of the pattern matching, the target recognition section 11 determines whether a part of a human, such as an upper part of a body, an arm, a head, a foot, is present around the obstacle 50.

Based on the type thus determined of the target 60 or the relative speed of the target 60 to the own vehicle 40, the driving assist ECU 10 determines whether the target 60 is to be an operation subject of the collision avoidance control. Specifically, the operation determination section 13 determines, based on the type of the target 60, whether there is a possibility that the target 60 will move, and then determines, based on results of the determination, whether the target 60 is present on the traveling course of the own vehicle 40. Alternatively, the activation determination section 13 determines whether the target 60 is moving on the basis of the relative speed of the target 60 to the own vehicle 40, and then determines whether the target 60 is present on the traveling course of the own vehicle 40 based on results of the determination. As a result, in the case where there is a possibility that the target 60 will move or the case where the target 60 is moving, the activation determination section 13 determines whether the target 60 is present on the traveling course of the own vehicle 40. For example, in the case where the target 60 present on the other side of the obstacle 50 is not a stationary object as with a human, a vehicle, or the like, there is a possibility that the target 60 will move, and thus the target 60 needs to be an operation subject of the collision avoidance control. Accordingly, the driving assist ECU 10 considers the target 60 to be an operation subject of the collision avoidance control. In the case where the target 60 present on the other side of the obstacle 50 is a stationary object that is not a human, a vehicle, or the like, there is no possibility that the target 60 will move, and thus the target 60 does not need to be an operation subject of the collision avoidance control. Accordingly, the driving assist ECU 10 considers the target 60 not to be an operation subject of the collision avoidance control and excludes the target 60 from the operation subject. Even in the case where the target 60 is a human, a vehicle, or the like, if the target 60 is not moving, the target 60 can be excluded from the operation subject.

In this manner, the driving assist ECU 10 can detect the target 60 present on the other side of the obstacle 50. Note here that the following problem is expected. In the case where a relative position and a relative speed of the target 60 are detected by the radar device 21, most of probe waves and reflection waves are blocked by the obstacle 50. This reduces detection accuracy. Since most of the probe waves and the reflection waves are blocked by the obstacle 50, a relative position and a relative speed of the obstacle 50 may not be detected every time for each control cycle by the radar device 21. According to the driving assist ECU 10, in the case where a relative position and a relative speed of the target 60 are not detected, a relative position and a relative speed of the target 60 are estimated based on a relative position and a relative speed of the target 60 which have been acquired at a control cycle before a relative position and a relative speed are not acquired. This reduces detection accuracy of the relative position and the relative speed of the target 60 as compared with a case where the obstacle 50 is not present. Thus, according to the driving assist ECU 10, in the case where the collision avoidance control is performed based on the relative position and the relative speed of the target 60 detected with low accuracy, an unnecessary activation of the safety device may occur.

According to the present embodiment, therefore, in the case where the obstacle 50 is present between the own vehicle 40 and the target 60, a limiting value (limiting value for a determination region) for determining whether the target 60 is present on the traveling course of the own vehicle 40 is set to a value smaller than that to be set in the case where the obstacle 50 is not present. According to the present embodiment, the limiting value calculation section 12 of the driving assist ECU 10 functions as first setting means. Specifically, the limiting value calculation section 12 acquires determination results of whether the target 60 is present (determination results of where the target 60 is present on the other side of the obstacle 50), from the target recognition section 11. Based on the determination results of whether the target 60 is present, the limiting value calculation section 12 determines whether the obstacle 50 is present between the own vehicle 40 and the target 60. As a result, in the case where the obstacle 50 is not present between the own vehicle 40 and the target 60, the limiting value calculation section 12 sets a normal limiting value which is a reference value that is set in advance as a determination criterion. Meanwhile, in the case where the obstacle 50 is present between the own vehicle 40 and the target 60, the limiting value calculation section 12 sets a corrected limiting value which is a value smaller than the normal limiting value. In this case, the limiting value calculation section 12 supplies the normal limiting value or the corrected limiting value to the activation determination section 13 and instructs the activation determination section 13 to set a limiting value. Upon receipt of the instruction, the activation determination section 13 sets a limiting value (rightward limiting value XR and leftward limiting value XL) for a determination region based on the normal limiting value or the corrected limiting value which has been supplied. As described above, in the case where the obstacle 50 is present between the own vehicle 40 and the target 60, the driving assist ECU 10 of the present embodiment performs a process in which a limiting value is set to a smaller value and a width in a lateral direction of the determination region is narrowed. Thus, according to the driving assist ECU 10 of the present embodiment, the target 60 present on the other side of the obstacle 50 is caused not to be located (to be less likely to be located) in the determination region. As a result, the driving assist ECU 10 of the present embodiment can make the target 60 less likely to be determined to be present on the traveling course of the own vehicle 40 when the obstacle 50 is present between the own vehicle 40 and the target 60.

Figure 4:
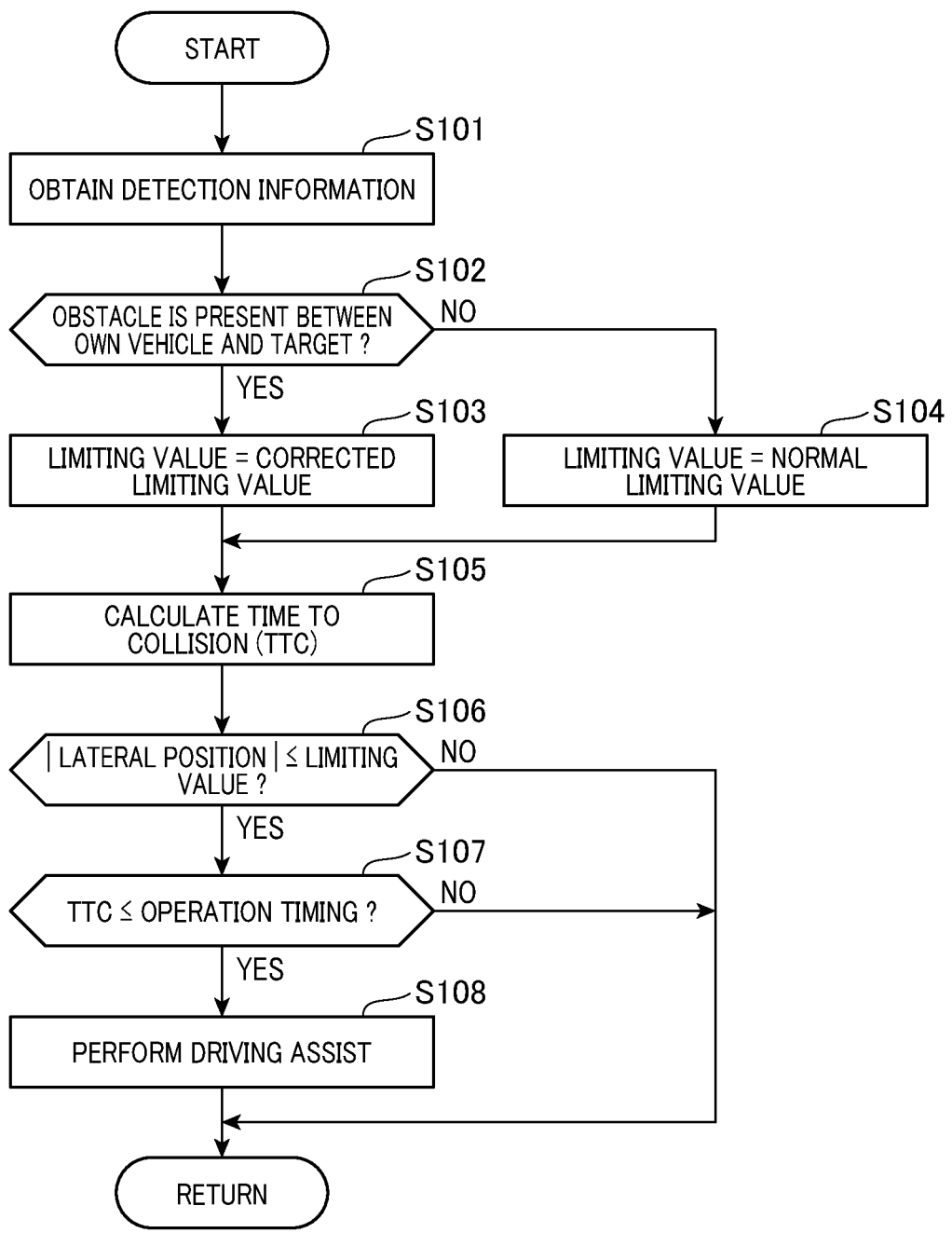
FIG. 4 is a flow chart illustrating a process of the first embodiment.

With reference to FIG. 4, the following description will discuss a series of processes performed by the driving assist ECU 10 of the present embodiment. The processes shown in FIG. 4 are performed, for each predetermined control cycle, with respect to each target 60 present ahead of the own vehicle 40 in traveling direction.

First, the driving assist ECU 10 acquires detection information (a position and a speed) from the sensor device (S101). Based on the detection information thus acquired, the driving assist ECU 10 determines whether the target 60 is present ahead of the own vehicle 40 in the traveling direction, and the obstacle 50 is present between the own vehicle 40 and the target 60 (S102). In this case, the driving assist ECU 10 determines whether the target 60 is present on the other side of the obstacle 50 based on the detection information. Based on results of the determination of whether the target 60 is present, the driving assist ECU 10 determines whether the obstacle 50 is present between the own vehicle 40 and the target 60. As a result, upon determination by the driving assist ECU 10 that the obstacle 50 is present between the own vehicle 40 and the target 60 (YES in S102), the driving assist ECU 10 sets the corrected limiting value as the limiting value (S103). That is, the driving assist ECU 10 sets, as the limiting value (limiting value for a determination region) for determining whether the target 60 is located on the traveling course of the own vehicle 40, the corrected limiting value smaller than the reference value for determination. Meanwhile, upon determination by the driving assist ECU 10 that the obstacle 50 is not present between the own vehicle 40 and the target 60 (NO in S102), the driving assist ECU 10 sets the normal limiting value as the limiting value (S104). That is, the driving assist ECU 10 sets, as the limiting value for determining whether the target 60 is located on the traveling course of the own vehicle 40, the normal limiting value which is the reference value for determination.

Subsequently, the driving assist ECU 10 calculates a time to collision (TTC) which is a predicted time until the own vehicle 40 collides with the target 60 based on the detection information (S105). The driving assist ECU 10 determines whether a lateral position of the target 60 is within a range of the limiting value (in the determination region) based on the detection information (S106). In this case, the driving assist ECU 10 determines whether an absolute value of the lateral position of the target 60 is not more than the limiting value which has been set. As a result, if the driving assist ECU 10 determines that the lateral position of the target 60 is within the range of the limiting value (YES in S106), there is a high probability that the target 60 is located on the traveling course of the own vehicle 40 in the time to collision (TTC). Accordingly, in order to avoid a collision with the target 60, the driving assist ECU 10 determines whether the time to collision (TTC) has reached the timing of activation of the safety device (S107). In this case, the driving assist ECU 10 determines whether the time to collision (TTC) has exceeded a set time for the timing of activation of the safety device. As a result, upon determination by the driving assist ECU 10 that the time to collision (TTC) has reached the timing of activation of the safety device to be operated (YES in S107), the driving assist ECU 10 activates the safety device to perform a driving assist for avoiding a collision risk is performed (S108). Then, the driving assist ECU 10 terminates the series of processes.

Upon determination by the driving assist ECU 10 that the lateral position of the target 60 is outside the range of the limiting value (NO in S106), the driving assist ECU 10 terminates the series of processes without activating the safety device. Similarly, upon determination by the driving assist ECU 10 that the time to collision (TTC) has not reached the timing of activation of the safety device (NO in S107), the driving assist ECU 10 terminates the series of processes without activating the safety device.

The aforementioned configuration of the object detection apparatus (driving assist ECU 10) of the present embodiment provides the following effects.

In the case where the obstacle 50 (second target) is present between the own vehicle 40 and the target 60 (first target) located ahead of the own vehicle 40 in the traveling direction, detection accuracy for detecting a position of the target 60 is reduced. Accordingly, in the case where the limiting value and the position of the target 60 detected with low accuracy are used to determine whether the target 60 is located on the traveling course of the own vehicle 40, there is a possibility that it will be erroneously determined that the target 60 is located on the traveling course of the own vehicle 40 although the target 60 is not located on the traveling course of the own vehicle 40. In the case where the safety device is activated based on results of the determination, the activation of the safety device is an unnecessary activation. According to the object detection apparatus of the present embodiment, therefore, in the case where the obstacle 50 is present between the own vehicle 40 and the target 60, the limiting value for determining whether the target 60 is present on the traveling course of the own vehicle 40 is set to a value smaller than that to be set in the case where the obstacle 50 is not present. Therefore, the object detection apparatus of the present embodiment can make the target 60 less likely to be determined to be present on the traveling course of the own vehicle 40 in the case where the obstacle 50 is present between the own vehicle 40 and the target 60 to prevent an unnecessary activation of the safety device.

According to the object detection apparatus of the present embodiment, in the case where the target 60 present on the other side of the obstacle 50 is a stationary object or the target 60 is not moving in the lateral direction, the target 60 is excluded from the operation subject of the collision avoidance control. This allows the present embodiment to reduce a processing load of the driving assist ECU 10 which is the object detection apparatus.

Second Embodiment

According to the first embodiment, the determination region (region for determining whether the target 60 is present on the traveling course of the own vehicle 40) based on the rightward limiting value XR and the leftward limiting value XL is set to be ahead of the own vehicle 40 in traveling direction. According to the first embodiment it is determined whether there is a possibility that the own vehicle 40 will collide with the target 60 based on results of a determination whether the target 60 is present in the determination region which has been set. Meanwhile, according to the present embodiment, the travel path of the target 60 is predicted and a collision lateral position which is a position at which the target 60 is predicted to collide with the own vehicle 40 is calculated. According to the present embodiment, it is then determined whether the collision lateral position thus calculated is in the determination region based on the rightward limiting value XR and the leftward limiting value XL. According to the present embodiment, it is thus determined whether there is a possibility that the own vehicle 40 will collide with the target 60.

Figure 5:
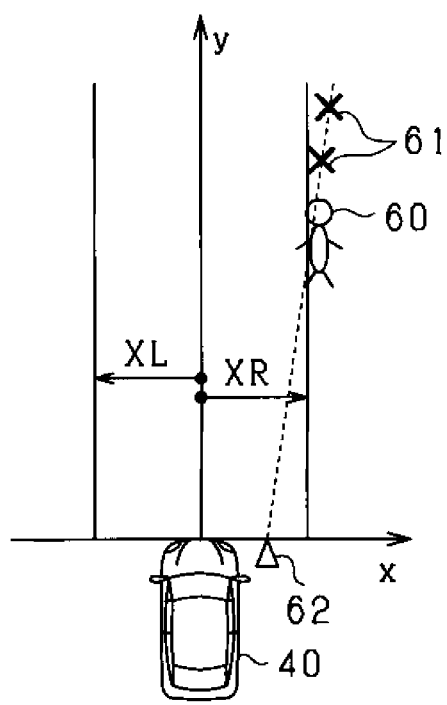
FIG. 5 is a view illustrating a collision lateral position.

With reference to FIG. 5, the following description will discuss the activation determination section 13 of the driving assist ECU 10 which is the object detection apparatus of the present embodiment. Specifically, the following description will discuss a determination process (a determination process for determining whether to activate the safety device) which is performed by the activation determination section 13. The rightward limiting value XR and the leftward limiting value XL of the present embodiment are similar to those of the first embodiment. Therefore, descriptions of these limiting values will be omitted. The activation determination section 13 of the present embodiment functions as calculation means. The driving assist ECU 10 of the present embodiment stores, over a predetermined time period, a previous position 61 (a longitudinal position and a lateral position) of the target 60 which has been detected, and records the previous position 61 as a position history of the target 60. The activation determination section 13 estimates the travel path of the target 60 based on the previous position 61, which has been recorded as the position history, of the target 60 and a current position of the target 60. Then, by assuming that the target 60 moves along the travel path thus estimated, the activation determination section 13 calculates a lateral position of a point at which a longitudinal position between the front end of the own vehicle 40 and the target 60 is zero as a collision lateral position 62.

The activation determination section 13 compares the collision lateral position 62 thus calculated with the rightward limiting value XR and the leftward limiting value XL which define the determination region. As a result, in the case where the collision lateral position 62 is in the determination region based on the rightward limiting value XR and the leftward limiting value XL, the activation determination section 13 determines that there is a possibility that the own vehicle 40 will collide with the target 60. Processes of the present embodiment to be performed after the activation determination section 13 has determined that there is a possibility that the own vehicle 40 will collide with the target 60 are similar to those of the first embodiment, and thus descriptions of the processes will be omitted.

As described above, in order to calculate the collision lateral position 62, it is necessary to acquire (detect) a position of the target 60 for a predetermined number of times (a first predetermined number of times). However, in the case where the obstacle 50 is present between the own vehicle 40 and the target 60, it takes time until the position of the target 60 is acquired for the predetermined number of times. Accordingly, it takes time to calculate the collision lateral position 62 and this may lead to a delay in activation of the safety device. According to the driving assist ECU 10 of the present embodiment, therefore, the collision lateral position 62 is calculated as below. In the case where the obstacle 50 is present between the own vehicle 40 and the target 60, the activation determination section 13 calculates the collision lateral position 62 when the number of acquisitions (the number of detection) of the position of the target 60 has reached a second predetermined number of times which is smaller than the first predetermined number of times.

Meanwhile, in the case where the number of acquisitions of the position of the target 60 is small, calculation accuracy of the collision lateral position 62 is reduced. This may cause an unnecessary activation of the safety device. According to the driving assist ECU 10 of the present embodiment, therefore, in the case where the number of acquisitions of the position of the target 60 is not less than the second predetermined number of times and is less than the first predetermined number of times, the following process is performed. The driving assist ECU 10 calculates the collision lateral position 62 and sets, as the limiting value (limiting value for a determination region) for determining whether the target 60 is located on the traveling course of the own vehicle 40, the corrected limiting value which is smaller than the reference value for determination. Meanwhile, according to the driving assist ECU 10 of the present embodiment, in the case where the number of acquisitions of the position of the target 60 is not less than the first predetermined number of times, calculation accuracy of the collision lateral position 62 is increased. Accordingly, the driving assist ECU 10 calculates the collision lateral position 62 and sets the normal limiting value which is the reference value for determination as the limiting value for determining whether the target 60 is located on the traveling course of the own vehicle 40.

Figure 6:
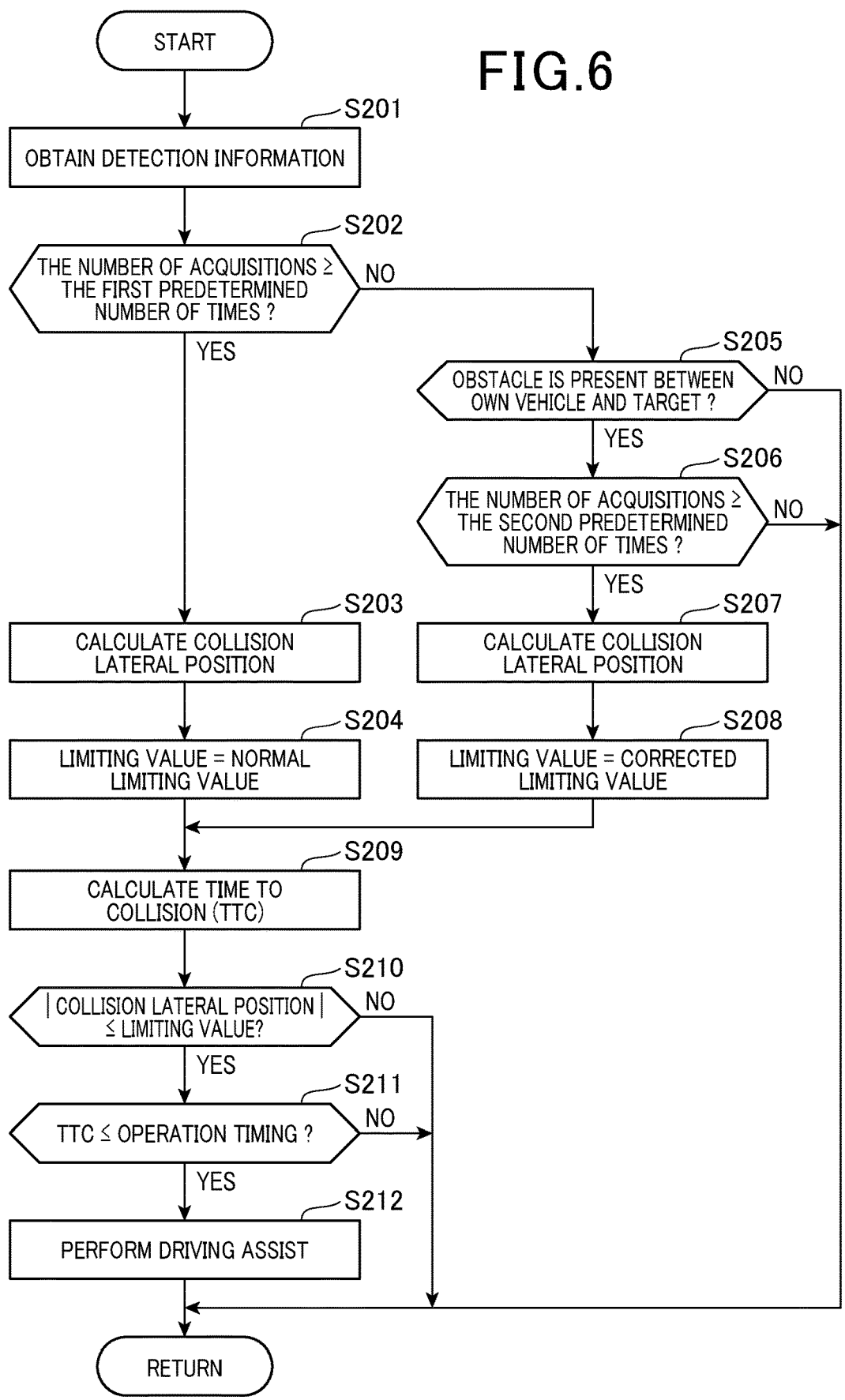
FIG. 6 is a flow chart illustrating a process of a second embodiment.

With reference to FIG. 6, the following description will discuss a series of processes performed by the driving assist ECU 10 of the present embodiment. The processes shown in FIG. 6 are performed, for each predetermined control cycle, with respect to each target 60 that is present ahead of the own vehicle 40 in the traveling direction.

First, the driving assist ECU 10 acquires detection information (a position and a speed) from the sensor device (S201). The driving assist ECU 10 determines whether the number of acquisitions of the position of the target 60 is not less than the first predetermined number of times (S202). As a result, upon determination by the driving assist ECU 10 that the number of acquisitions of the position of the target 60 is not less than the first predetermined number of times (YES in S202), the driving assist ECU 10 calculates the collision lateral position 62 based on the detection information (the position history of the target 60) (S203). The collision lateral position 62 in this case is accurately calculated. Accordingly, the driving assist ECU 10 sets, as the limiting value, the normal limiting value which is the reference value for determination (S204).

Meanwhile, upon determination by the driving assist ECU 10 that the number of acquisitions of the position of the target 60 is less than the first predetermined number of times (NO in S202), the driving assist ECU 10 determines whether the obstacle 50 is present between the own vehicle 40 and the target 60 (S205). Upon determination by the driving assist ECU 10 that the obstacle 50 is present between the own vehicle 40 and the target 60 (YES in S205), the driving assist ECU 10 determines whether the number of acquisitions of the position of the target 60 is not less than the second predetermined number of times which is smaller than the first predetermined number of times (S206). As a result, upon determination by the driving assist ECU 10 that the number of acquisitions of the position of the target 60 is not less than the second predetermined number of times (YES in S206), the driving assist ECU 10 calculates the collision lateral position 62 based on the detection information (S207). As described above, calculation accuracy of the collision lateral position 62 in this case is low. Accordingly, in order to suppress an unnecessary activation of the safety device, the driving assist ECU 10 sets the corrected limiting value which is smaller than the reference value for determination (S208) as the limiting value.

Upon determination by the driving assist ECU 10 that the obstacle 50 is not present between the own vehicle 40 and the target 60 (NO in S205), the driving assist ECU 10 does not calculate the collision lateral position 62 of the target 60 and terminates the series of processes. This process is similarly repeated until the number of acquisitions of the position of the target 60 becomes not less than the second predetermined number of times. Also, upon determination by the driving assist ECU 10 that the obstacle 50 is present between the own vehicle 40 and the target 60 (YES in S205) and that the number of acquisitions of the position of the target 60 is less than the second predetermined number of times (NO in S206), the driving assist ECU 10 does not calculate the collision lateral position 62 of the target 60 and terminates the series of processes to be ended. This process is similarly repeated until the number of acquisitions of the position of the target 60 becomes not less than the second predetermined number of times.

Subsequently, the driving assist ECU 10 calculates a time to collision (TTC) based on the detection information (S209). The driving assist ECU 10 determines whether the collision lateral position 62 of the target 60 is within a range of the limiting value (in the determination region) (S210). In this case, the driving assist ECU 10 determines whether an absolute value of the collision lateral position 62 which has been calculated is not more than the limiting value which has been set. As a result, upon determination by the driving assist ECU 10 that the collision lateral position 62 of the target 60 is within the range of the limiting value (YES in S210), there is high probability that the target 60 is located on the traveling course of the own vehicle 40 in the time to collision (TTC). Accordingly, in order to avoid a collision with the target 60, the driving assist ECU 10 determines whether the time to collision (TTC) has reached the timing of activation of the safety device (S211). As a result, upon determination by the driving assist ECU 10 that the time to collision (TTC) has reached the timing of activation of the safety device (YES in S211), the driving assist ECU 10 activates the safety device to perform a driving assist for avoiding a collision risk is performed (S212). Then, the driving assist ECU 10 terminates the series of processes.

Upon determination by the driving assist ECU 10 that the collision lateral position 62 of the target 60 is outside the range of the limiting value (NO in S210), the driving assist ECU 10 terminates the series of processes without activating the safety device. Similarly, upon determination by the driving assist ECU 10 that the time to collision (TTC) has not reached the timing of activation of the safety device (NO in S211), the driving assist ECU 10 terminates the series of processes without activating the safety device.

As described above, according to the driving assist ECU 10 of the present embodiment, in the case where the number of acquisitions of the position of the target 60 is less than the first predetermined number of times, the processes S205 to S208 are performed. During the processes S205 to S208, the corrected limiting value which is smaller than the reference value for determination is used as the limiting value for determining whether the target 60 is located on the traveling course of the own vehicle 40. In the case where the series of processes is iterated, the number of acquisitions of the position of the target 60 increases so as to reach the first predetermined number of times with which the collision lateral position 62 can be accurately calculated. In this case, according to the driving assist ECU 10 of the present embodiment, the processes S203 and S204 are performed. As a result, the limiting value for determining whether the target 60 is located on the traveling course of the own vehicle 40 is set back to the normal limiting value which is the reference value for determination.

With the aforementioned configuration, the object detection apparatus (driving assist ECU 10) of the present embodiment provides the following effects, in addition to the effects provided by the object detection apparatus of the first embodiment.

In the case where the collision lateral position 62 of the target 60 is calculated, in order to accurately calculate the collision lateral position 62, it is necessary to acquire the position of the target 60 the first predetermined number of times or more. However, in the case where the obstacle 50 is present between the own vehicle 40 and the target 60, it takes time until the position of the target 60 is acquired the first predetermined number of times. Accordingly, it takes time to calculate the collision lateral position 62 and this may lead to a delay in activation of the safety device. Meanwhile, in the case where the collision lateral position 62 is calculated before the position of the target 60 is acquired the first predetermined number of times (by the number of times less than the first predetermined number of times), calculation accuracy of the collision lateral position 62 is low. Accordingly, in the case where the safety device is activated based on the collision lateral position 62 calculated with low accuracy, the activation of the safety device may be an unnecessary activation. Therefore, the object detection apparatus of the present embodiment calculates the collision lateral position 62 in the case where the number of acquisitions of the position of the target 60 has reached the second predetermined number of times which is smaller than the first predetermined number of times. Furthermore, according to the object detection apparatus, the limiting value (limiting value for a determination region) for determining whether the target 60 is located on the traveling course of the own vehicle 40 is set to a value smaller than the reference value for determination. That is, the object detection apparatus of the present embodiment performs a process in which the limiting value is set to a smaller value to decrease the width in the lateral direction of the determination region in the case where the number of acquisitions of the position of the target 60 has reached the second predetermined number of times. As a result the object detection apparatus, prevents the collision lateral position 62 calculated with low accuracy from being located (being less likely to be located) on the traveling course of the own vehicle 40. Therefore, the object detection apparatus of the present embodiment is able to prevent a delay in activation of the safety device and an unnecessary activation of the safety device. The object detection apparatus makes the target 60 less likely to be erroneously determined in the case where it is determined, based on the collision lateral position 62 calculated with low accuracy, whether the target 60 is present on the traveling course of the own vehicle 40. This allows the object detection apparatus to prevent an unnecessary activation of the safety device. In addition, according to the object detection apparatus, in the case where the number of acquisitions of the position of the target 60 is reached the first predetermined number of times, the limiting value which is set to a value (corrected limiting value) smaller than the reference value for determination is set back to an original value (normal limiting value) which is the reference value for determination. That is, the object detection apparatus of the present embodiment performs a process in which the limiting value is set back to the original value to increase the width in the lateral direction of the determination region, in the case where the number of acquisitions of the position of the target 60 has reached the first predetermined number of times. As a result, according to the object detection apparatus the collision lateral position 62 which has been accurately calculated is located (is likely to be located) on the traveling course of the own vehicle 40. This allows the object detection apparatus of the present embodiment to prevent a non-activation of the safety device.

Third Embodiment

Figure 7:
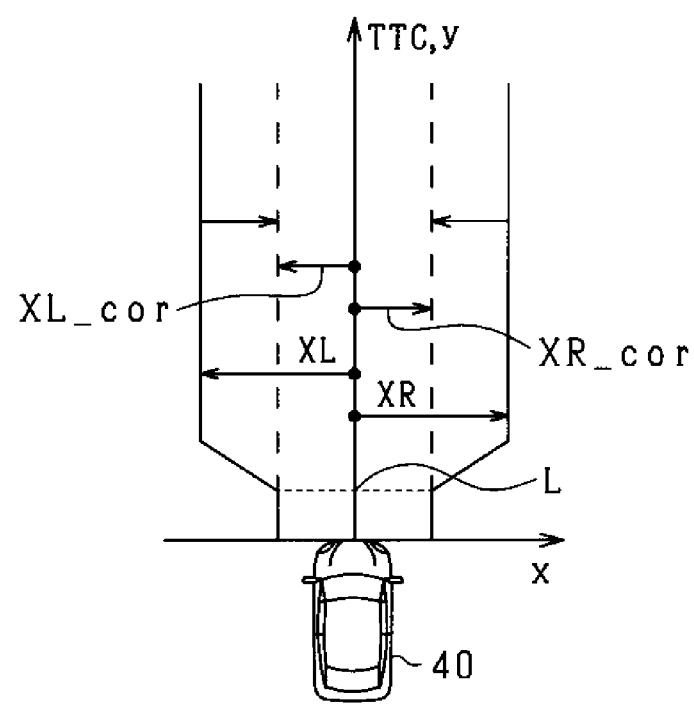
FIG. 7 is a view illustrating a determination region of a third embodiment.

The object detection apparatus (driving assist ECU 10) of the present embodiment differs from those of the first and second embodiments in how to set the limiting value (limiting value for a determination region) for determining whether the target 60 is located on the traveling course of the own vehicle 40. With reference to FIG. 7, the following description will discuss setting of the limiting value by the activation determination section 13 of the driving assist ECU 10 of the present embodiment. In the case where the obstacle 50 is not present between the own vehicle 40 and the target 60, the activation determination section 13 sets a normal limiting value (rightward limiting value XR and leftward limiting value XL) as below. As indicated by a solid line, the normal limiting value of the present embodiment is set to a constant value until the time to collision (TTC) reaches a predetermined time or the longitudinal position of the own vehicle 40 reaches a predetermined position L. The normal limiting value is set to gradually increase thereafter as a value of the time to collision (TTC) increases (time becomes longer) or a value of the longitudinal position of the own vehicle 40 increases (a distance becomes longer). The normal limiting value is set to a constant value after being gradually increased. That is, according to the activation determination section 13, the limiting value is set to be larger as a value of the time to collision (TTC) or a value of the longitudinal position is larger.

Meanwhile, in the case where the obstacle 50 is present between the own vehicle 40 and the target 60, the activation determination section 13 sets a corrected limiting value (rightward corrected value XR_cor and leftward corrected value XL_cor) as below. As indicated by a dashed line, the corrected limiting value of the present embodiment is set to a constant value regardless of the time to collision (TTC) or the longitudinal position of the own vehicle 40. The constant corrected limiting value is the same value as the normal limiting value which is set until the time to collision (TTC) reaches the predetermined time or the longitudinal position of the own vehicle 40 reaches the predetermined position L.

With the aforementioned configuration, the object detection apparatus (driving assist ECU 10) of the present embodiment provides the following effects.

A target 60 located far away from the own vehicle 40 (a target 60 for which a calculation value of the time to collision (TTC) is large) may move onto the traveling course of the own vehicle 40 by its subsequent lateral movement. According to the object detection apparatus of the present embodiment, therefore, the limiting value (limiting value for a determination region) for determining whether the target 60 is located on the traveling course of the own vehicle 40 is set to be larger as the target 60 is located farther away from the own vehicle 40 (as the time to collision (TTC) is longer). Consequently, the object detection apparatus can easily determine that there is a possibility that the own vehicle 40 will collide with the target 60 located far away from the own vehicle 40. This allows the object detection apparatus of the present embodiment to prevent a delay in activation of the safety device with respect to the target 60 which may laterally move. Meanwhile, in the case where the obstacle 50 is present between the own vehicle 40 and the target 60 so that detection accuracy of a position or a speed of the target 60 is low and it is likely to be determined that there is a possibility that the own vehicle 40 will collide with the target 60, an unnecessary activation of the safety device may occur. In regard to this point, the object detection apparatus of the present embodiment performs a process in which the limiting value is set to the corrected limiting value to decrease the width in the lateral direction of the determination region is narrowed in the case where the obstacle 50 is present between the own vehicle 40 and the target 60. This allows the object detection apparatus of the present embodiment to prevent an occurrence of an unnecessary activation of the safety device even in the case where the obstacle 50 is present between the own vehicle 40 and the target 60 so that detection accuracy of the position or the speed of the target 60 is low.

Modified Example

According to the aforementioned embodiments, in the case where the obstacle 50 is present between the own vehicle 40 and the target 60, the limiting value calculation section 12 functions as the first setting means and the limiting value for determining whether the target 60 is located on the traveling course of the own vehicle 40 is set to a smaller value. Meanwhile, a modified example can be configured such that in the case where the obstacle 50 is present between the own vehicle 40 and the target 60, the limiting value calculation section 12 functions as the second setting means and the limiting value is set to a larger value so that a non-activation of the safety device is prevented.

According to the aforementioned embodiments, in the case where the obstacle 50 is present between the own vehicle 40 and the target 60, the limiting value calculation section 12 functions as the first setting means and performs only a process in which the limiting value for the target 60 is set to a smaller value. Meanwhile, the modified example can be configured such that the limiting value calculation section 12 functions as the first and second setting means and performs both of a process in which the limiting value is set to a larger value and a process in which the limiting value is set to a smaller value, based on, for example, a positional relationship between the own vehicle 40 and the target 60. For example, the limiting value can be set to a larger value for a region near the own vehicle 40 (in the case where a calculation value of the time to collision (TTC) is small) so that a non-activation of the safety device is prevented. Furthermore, the limiting value can be set to a smaller value for a region far away from the own vehicle 40 (in the case where a calculation value of the time to collision (TTC) is large) so that an unnecessary activation of the safety device is prevented. Alternatively, the limiting value can be set to a smaller value for the region near the own vehicle 40 so that an unnecessary activation of the safety device is prevented. Furthermore, the limiting value can be set to a larger value for the region far away from the own vehicle 40 so that a non-activation of the safety device is prevented.

In the case where a relative speed of the target 60 to the own vehicle 40 is large, it is necessary to prevent a non-activation of the safety device as compared with a case where the relative speed is small. In such a case, the limiting value can be set not be changed (corrected) even in the case where the obstacle 50 is present between the own vehicle 40 and the target 60. Even in the case where the limiting value is changed to be smaller, it is possible to cause an amount of the change (an amount of the correction) to be small.

The modified example can be configured to determine whether the own vehicle 40 is traveling on a road (a curved section) having a curved line shape or the like and change the limiting value based on results of the determination. When the own vehicle 40 is traveling on the curved section, even in the case where the target 60 is present ahead of the own vehicle 40, the own vehicle 40 is less likely to collide with the target 60. In such a case, therefore, the limiting value is set to a smaller value. In this case, it is possible to cause an amount of change in limiting value to be small in the case where the obstacle 50 is present between the own vehicle 40 and the target 60.

The modified example can be configured such that a size of the obstacle 50 is detected by the target recognition section 11 and then the limiting value is changed based on the detected size of the obstacle 50. That is, the target recognition section 11 of the modified example functions as second target information acquiring means for acquiring, as obstacle information (second target information), at least one of the type of the obstacle 50 and the size of the obstacle 50. In the case where the obstacle 50 is small (for example, in the case where the obstacle 50 has a small height and/or a small width), the target 60 is likely to be visible to the driver of the own vehicle 40. In this case, the limiting value can be set to a smaller value so that an unnecessary activation of the safety device is prevented. Meanwhile, in the case where the obstacle 50 is large (for example, in the case where the obstacle 50 has a large height and/or a large width), the target 60 is likely to be invisible to the driver of the own vehicle 40. In this case, the limiting value can be set to a larger value so that a non-activation of the safety device is prevented.

The obstacle 50 which is a stationary object is not limited to a vehicle which is stopped or parked. For example, a utility pole, a roadside tree, a road sign, or the like is recognized as the obstacle 50 which is a stationary object. According to the modified example, also in the case where a lane (an adjacent lane) adjacent to a lane in which the own vehicle 40 is traveling is congested and a vehicle traveling in the adjacent lane is traveling at a slow speed, the vehicle can be recognized as the obstacle 50 which is a stationary object. In this case, a traveling direction of the vehicle travailing in the adjacent lane can be the same as or opposite to that of the own vehicle 40. The modified example can be configured such that the target recognition section 11 determines a type of the obstacle 50 and then the limiting value is changed based on results of the determination (type).

The modified example can be configured such that the limiting value to be set in the case where the obstacle 50 is present between the own vehicle 40 and the target 60 is changed based on a positional relationship of the own vehicle 40, the target 60, and the obstacle 50. For example, in the case where the obstacle 50 is located on a straight line connecting the own vehicle 40 and target 60, detection accuracy of a position of the target 60 is reduced as compared with the case where the obstacle 50 is not located on the straight line. In this case, the limiting value can be set to a smaller value so that an unnecessary activation of the safety device is prevented. Meanwhile, in the case where the obstacle 50 is not located on the straight line connecting the own vehicle 40 and target 60 (in the case where the obstacle 50 is located at a position displaced from the straight line), it is possible to set an amount of change in limiting value to be small as compared with the case where the obstacle 50 is located on the straight line, or it is possible to set the limiting value not to be changed. This allows detection accuracy of the position of the target 60 to be increased.

According to the modified example, the process of the second embodiment in which process the limiting value is changed based on the number of acquisitions (the number of detection) of the position of the target 60 can be applied to the first embodiment. Alternatively, in the second embodiment, in the case where the obstacle 50 is present between the own vehicle 40 and the target 60, the limiting value can be set to the corrected limiting value regardless of the number of acquisitions of the position of the target 60, as in the first embodiment.

The modified example can be configured such that the limiting value is set to be larger as the relative speed of the target 60 to the own vehicle 40 is larger. The modified example can be configured such that it is determined whether the own vehicle 40 is traveling straight ahead and then the limiting value is changed based on results of the determination.

The modified example can be configured such that a different value is set as the limiting value for each function of the safety device. Furthermore, the modified example can be configured such that a different value is set as the limiting value to be set in the case where the obstacle 50 is present between the own vehicle 40 and the target 60.

According to the aforementioned embodiments, the object detection apparatus is the driving assist system which avoids a collision of the own vehicle 40 with an object located ahead of the own vehicle 40. However, the object detection apparatus of the present disclosure is not limited to this. The object detection apparatus of the present disclosure can be applied to, for example, a driving assist system which detects an object located behind of the own vehicle 40 and avoids a collision of the own vehicle 40 with the object thus detected. The object detection apparatus of the present disclosure can be applied to a driving assist system which avoids a collision of the own vehicle 40 with an object approaching the own vehicle 40. Note that the phrase "ahead of the own vehicle in the traveling direction," which has been used in the descriptions of the aforementioned embodiments, means "ahead of the own vehicle 40," in the case where the own vehicle 40 is traveling forward. Meanwhile, in the case where the own vehicle 40 is traveling backward, the phrase means "to the rear of the own vehicle 40."

According to the aforementioned embodiments, the notification device 31, the braking device 32, and the steering device 33 are mentioned as the safety device. However, the safety device connectable to the object detection apparatus of the present disclosure is not limited to these devices.

The own vehicle 40 equipped with the object detection apparatus of the present disclosure is not limited to a vehicle driven by a person in the vehicle. The object detection apparatus of the present disclosure is similarly applicable to, for example, a vehicle automatically driven by an ECU or the like.

REFERENCE SIGNS LIST

10: Driving assist ECU, 11: Target recognition section. 12: Limiting value calculation section, 13: Activation determination section, 14: Control processing section, 21: Radar device, 22: Image capturing device, 23: Vehicle speed sensor, 31: Notification device, 32: Braking device, 33: Steering device.

The invention claimed is:

1. An object detection apparatus comprising:
an acquisition means for acquiring a lateral position which is a relative position of a target to an own vehicle in a lateral direction orthogonal to a traveling direction of the own vehicle, the target being located ahead of the own vehicle in the traveling direction;
a target determination means for determining that a first target is present ahead of the own vehicle as the target, and that a second target is present between the first target and the own vehicle;
a setting means for setting a limiting value which indicates a width in the lateral direction; and
a presence determination means for determining whether the first target is present on a traveling course of the own vehicle based on the lateral position of the first target and the limiting value, wherein:
the setting means sets a predetermined reference value which is a criterion for determining whether the first target is present on the traveling course of the own vehicle as the limiting value in response to the second target not being present, and sets a value different from the reference value, as the limiting value in response to the second target being present;
the acquisition means acquires the lateral position of the target at a predetermined cycle; and
in response to the second target being present, the setting means sets the limiting value such that until the number of acquisitions of the lateral position of the first target reaches a predetermined number of times, the setting means sets a value different from the reference value, as the limiting value, and in response to the number of acquisitions of the lateral position having reached the predetermined number of times, the setting means sets the reference value as the limiting value.

2. The object detection apparatus according to claim 1, comprising a first setting means as the setting means in response to the second target being present, the first setting means setting, as the limiting value, a value smaller than the reference value.

3. The object detection apparatus according to claim 1, comprising a second setting means as the setting means for setting, as the limiting value, a value larger than the reference value in response to the second target being present.

4. The object detection apparatus according to claim 1, wherein the second target is a stationary object.

5. The object detection apparatus according to claim 1, further comprising a type determination means for determining a type of the first target, wherein upon determination based on the type that there is a possibility that the first target will move, the presence determination means determines whether the first target is present on the traveling course of the own vehicle.

6. The object detection apparatus according to claim 5, wherein the setting means sets the limiting value based on the type.

7. The object detection apparatus according to claim 1, wherein:
the acquisition means further calculates a relative speed of the first target to the own vehicle in the lateral direction; and
upon determination based on the relative speed that the first target is moving, the presence determination means determines whether the first target is present on the traveling course of the own vehicle.

8. The object detection apparatus according to claim 1, further comprising a calculation means,
the acquisition means further acquiring a longitudinal position which is a relative position of the target to the own vehicle in the traveling direction of the own vehicle,
the calculation means estimating a travel path of the first target based on a history of the longitudinal position and the lateral position and calculating, as a collision lateral position, the lateral position of the first target in response to, on the travel path, the longitudinal position being a position of a front end of the own vehicle, wherein
the presence determination means determines whether the first target is present on the traveling course of the own vehicle, based on the collision lateral position and the limiting value.

9. The object detection apparatus according to claim 8, wherein:
the acquisition means acquires the lateral position and the longitudinal position of the target at a predetermined cycle; and
in response to the second target being present, the setting means sets the limiting value such that until the number of acquisitions of the lateral position and the longitudinal position of the first target reaches a predetermined number of times, the setting means sets a value different from the reference value, as the limiting value, and in response to the number of acquisitions of the lateral position and the longitudinal position having reached the predetermined number of times, the setting means sets the reference value as the limiting value.

10. The object detection apparatus according to claim 1, further comprising a collision time predicting means,
the acquisition means further acquiring a longitudinal position which is a relative position of the first target to the own vehicle in the traveling direction of the own vehicle and a relative speed of the first target to the own vehicle in the traveling direction of the own vehicle,
the collision time predicting means calculating, based on the relative speed and the longitudinal position, a time to collision which is a predicted time until the longitudinal position becomes zero and the own vehicle collides with the first target, wherein
in response to the second target being present, the setting means sets the limiting value such that the limiting value is smaller as a value of the time to collision is larger.

11. The object detection apparatus according to claim 10, wherein in response to the second target not being present, the setting means sets the limiting value such that the limiting value is larger as a value of the time to collision is larger.

12. The object detection apparatus according to claim 1, wherein:
the own vehicle is equipped with a safety device that avoids a collision between the own vehicle and the target or that reduces damage of a collision;
the safety device has a plurality of functions; and the limiting value is set such that different values are set for the respective plurality of functions.

13. The object detection apparatus according to claim 1, further comprising a second target information acquiring means for acquiring, as second target information, at least one of a type of the second target and a size of the second target, wherein the setting means changes the limiting value based on the second target information.

14. A method of detecting an object which method is performed by an object detection apparatus provided in the own vehicle, the object detection apparatus performing the steps of:

acquiring a lateral position which is a relative position of a target to the own vehicle in a lateral direction orthogonal to a traveling direction of the own vehicle, the target being located ahead of the own vehicle in the traveling direction;

determining that a first target is present, as the target, ahead of the own vehicle and that a second target is present between the first target and the own vehicle;

setting, ahead of the own vehicle in the traveling direction, a determination region based on a limiting value which indicates a width in the lateral direction;

determining that the first target is present on a traveling course of the own vehicle in the case where the lateral position of the first target is inside the determination region, in the setting step, the limiting value being set such that in response to the second target not being present, a predetermined reference value which is a criterion for determining whether the first target is present on the traveling course of the own vehicle is set as the limiting value, and in response to the second target being present, a value different from the reference value is set as the limiting value; and acquiring the lateral position of the target at a predetermined cycle, and in the setting step, in response to the second target being present, setting the limiting value such that until the number of acquisitions of the lateral position of the first target reaches a predetermined number of times, setting a value different from the reference value, as the limiting value, and in response to the number of acquisitions of the lateral position having reached the predetermined number of times, setting the reference value as the limiting value.

15. An object detection apparatus comprising:
a memory;
a processor communicable to the memory; and
a set of computer-executable instructions stored on the memory that cause the processor to implement:
acquiring a lateral position which is a relative position of a target to an own vehicle in a lateral direction orthogonal to a traveling direction of the own vehicle, the target being located ahead of the own vehicle in the traveling direction;
determining that a first target is present ahead of the own vehicle as the target, and that a second target is present between the first target and the own vehicle;
setting, ahead of the own vehicle in the traveling direction, a determination region based on a limiting value which indicates a width in the lateral direction;
determining that the first target is present on a traveling course of the own vehicle in the case where the lateral position of the first target is inside the determination region, wherein
the processor sets a predetermined reference value which is a criterion for determining whether the first target is present on the traveling course of the own vehicle as the limiting value in response to the second target not being present, and sets a value different from the reference value, as the limiting value in response to the second target being present; and
acquiring the lateral position of the target at a predetermined cycle, wherein
in response to the second target being present, the processor sets the limiting value such that until the number of acquisitions of the lateral position of the first target reaches a predetermined number of times, the processor sets a value different from the reference value, as the limiting value, and in response to the number of acquisitions of the lateral position having reached the predetermined number of times, the processor sets the reference value as the limiting value.

16. The object detection apparatus according to claim 1, wherein the limiting value is one of a rightward limiting value and a leftward limiting value.

* * * * *